United States Patent
Fukui

(10) Patent No.: US 7,159,632 B2
(45) Date of Patent: Jan. 9, 2007

(54) NON-PNEUMATIC BICYCLE TIRE

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 66 days.

(21) Appl. No.: 10/982,874

(22) Filed: Nov. 8, 2004

(65) Prior Publication Data

US 2006/0096685 A1    May 11, 2006

(51) Int. Cl.
*B60C 7/00*   (2006.01)
(52) U.S. Cl. .................. 152/267; 152/246; 152/311; 152/394; 152/276; 152/278
(58) Field of Classification Search ............ 152/379.3, 152/379.4, 379.5, 382, 386, 387, 388, 393, 152/394, 246, 247, 268, 311, 400, 276, 278
See application file for complete search history.

(56) References Cited

U.S. PATENT DOCUMENTS

| | | | |
|---|---|---|---|
| 345,351 A * | 7/1886 | Whiton ...................... 152/387 |
| 355,359 A * | 1/1887 | Turner ........................ 152/386 |
| 365,091 A | 6/1887 | Owen |
| 438,383 A | 10/1890 | Overman |
| 628,284 A | 7/1899 | Quinster et al. |
| 657,832 A * | 9/1900 | Price ........................... 152/382 |
| 700,837 A * | 5/1902 | Seiberling .................. 152/382 |
| 753,401 A * | 3/1904 | Irwin ........................... 152/380 |
| 770,791 A * | 9/1904 | Andrew ...................... 152/400 |
| 789,937 A * | 5/1905 | Reed ........................... 152/386 |
| 819,036 A * | 5/1906 | Ashley ........................ 152/311 |
| 833,437 A * | 10/1906 | Broome ....................... 152/153 |
| 862,785 A | 8/1907 | Andrew |
| 918,846 A * | 4/1909 | Gostlin et al. .............. 152/322 |
| 936,008 A * | 10/1909 | Merigoux .................. 152/379.3 |
| 1,038,144 A * | 9/1912 | Hutchisen ................... 152/400 |
| 1,064,766 A | 6/1913 | Pfouts |
| 1,169,984 A | 2/1916 | Mettler |
| 1,194,177 A | 8/1916 | Henderson |
| 1,207,984 A * | 12/1916 | Geyer ........................... 172/70 |
| 1,319,865 A * | 10/1919 | Hale et al. .................. 152/327 |
| 1,322,608 A * | 11/1919 | Palmer ........................ 152/278 |
| 1,394,658 A * | 10/1921 | Williams ..................... 152/156 |
| 1,402,963 A | 1/1922 | Reed |
| 1,581,087 A | 4/1926 | Overman |
| 1,670,721 A | 5/1928 | Hitchner |
| 2,028,601 A * | 1/1936 | Hall ............................ 152/400 |
| 2,393,161 A | 1/1946 | Haushalter |
| 4,127,166 A | 11/1978 | Wyman |
| 4,273,176 A | 6/1981 | Wyman et al. |

(Continued)

FOREIGN PATENT DOCUMENTS

DE    167508    9/1904

(Continued)

*Primary Examiner*—Russell D. Stormer
(74) *Attorney, Agent, or Firm*—Global IP Counselors

(57) ABSTRACT

A non-pneumatic bicycle tire has a main tire body and at least one rim retaining member. The main tire body includes a rim engagement portion and a ground contact portion with a ground contact surface. The at least one rim retaining member is fixedly attached to the rim engagement portion. The at least one rim retaining member includes a pair of elastically deformable rim retaining portions extending laterally in opposite axial directions. Preferably, the main tire body has a plurality of the rim retaining members coupled thereto. In one embodiment, the rim retaining members are attached to the inner surface of the main tire body, while in another embodiment, the rim retaining members are embedded into the rim engagement portion of the main tire body.

13 Claims, 9 Drawing Sheets

| U.S. PATENT DOCUMENTS | | | GB | 276370 | 7/1928 |
| --- | --- | --- | --- | --- | --- |
| 6,431,235 B1 | 8/2002 | Steinke | GB | 1459998 | 12/1976 |

FOREIGN PATENT DOCUMENTS

GB 116677 6/1918

* cited by examiner

NON-PNEUMATIC BICYCLE TIRE

BACKGROUND OF THE INVENTION

1. Field of the Invention

This invention generally relates to a non-pneumatic bicycle tire. More specifically, the present invention relates to a non-pneumatic bicycle tire having an attachment structure for attaching the non-pneumatic bicycle tire to a bicycle rim.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the bicycle.

Essentially solid, cavity free, non-pneumatic tires are well known and have been used on bicycles for more than a century. In practice, non-pneumatic tires have the advantage of not going flat or experiencing a blow-out.

Pneumatic tires have generally utilized beads to hold the tire upon the wheel, and such beads usually are formed from high-tensile steel wire formed into inextensible hoops. The bead functions to anchor the plies of the tire together and to hold the tire on the wheel rim. The shape or flange of the bead conforms to the flange of the rim to prevent the tire from rocking, slipping or rolling off the wheel rim. However, for pneumatic tires, the air pressure within the tire exerts a force on the beads thereby holding the tire more firmly on the rim. While the beads have been successful in holding a pneumatic tire on a rim they are an additional cost, add to the weight of the tire, and require additional manufacturing, assembly time, resulting in increased production costs.

Solid tires and non-pneumatic tires can likewise be formed with beads, but in the absence of air pressure within the tire, fixing the tire to the rim can be problematic. Further, the forces exerted on the tire during high speed turns can cause even a tire with beads to become unseated.

It is therefore desirable to provide some means of fixing a non-pneumatic tire to the rim to ensure solid support for the tire, consistent traction and reliable installation of the tire on the rim in stressful riding situations.

In view of the above, it will be apparent to those skilled in the art from this disclosure that there exists a need for an improved non-pneumatic bicycle tire. This invention addresses this need in the art as well as other needs, which will become apparent to those skilled in the art from this disclosure.

SUMMARY OF THE INVENTION

One object of the present invention is to provide a non-pneumatic bicycle tire that is substantially maintenance free.

Another object of the present invention is to provide a non-pneumatic bicycle tire that provides a firm attachment to the rim.

Another object of the present invention is to provide a non-pneumatic bicycle tire that is relatively simple and inexpensive to manufacture and assemble.

In accordance with a first aspect of the present invention, the foregoing objects can basically be attained by providing a non-pneumatic bicycle tire that comprises a main tire body and at least one rim retaining member. The main tire body includes a rim engagement portion and a ground contact portion with a ground contact surface. The at least one rim retaining member is fixedly attached to the rim engagement portion. The at least one rim retaining member includes a pair of elastically deformable rim retaining portions extending laterally in opposite axial directions. The elastically deformable rim retaining portions are configured and arranged to bend elastically inwardly in an axial direction of the main tire body during installation on the rim.

In accordance with another aspect of the present invention, the at least one rim retaining member further includes a center connecting portion coupling the elastically deformable rim retaining portions together. Preferably, the center connecting portion and the elastically deformable rim retaining portions are formed as a one-piece, unitary member. More preferably, the retaining member is constructed from a thin metal sheet material.

In a preferred embodiment, the rim engagement portion has a plurality of rim retaining members having an identical shape to the at least one rim retaining member. Preferably, the rim retaining members are substantially equally spaced apart around the rim engagement portion in a circumferential direction.

In accordance with a ninth aspect of the present invention, each of the elastically deformable rim retaining portions has an outer abutment surface that is located adjacent a sidewall of the rim engagement portion and that faces outwardly in a generally outward radial direction.

In accordance with the present invention, the elastically deformable rim retaining portions can be either attached or embedded in the rim engagement portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
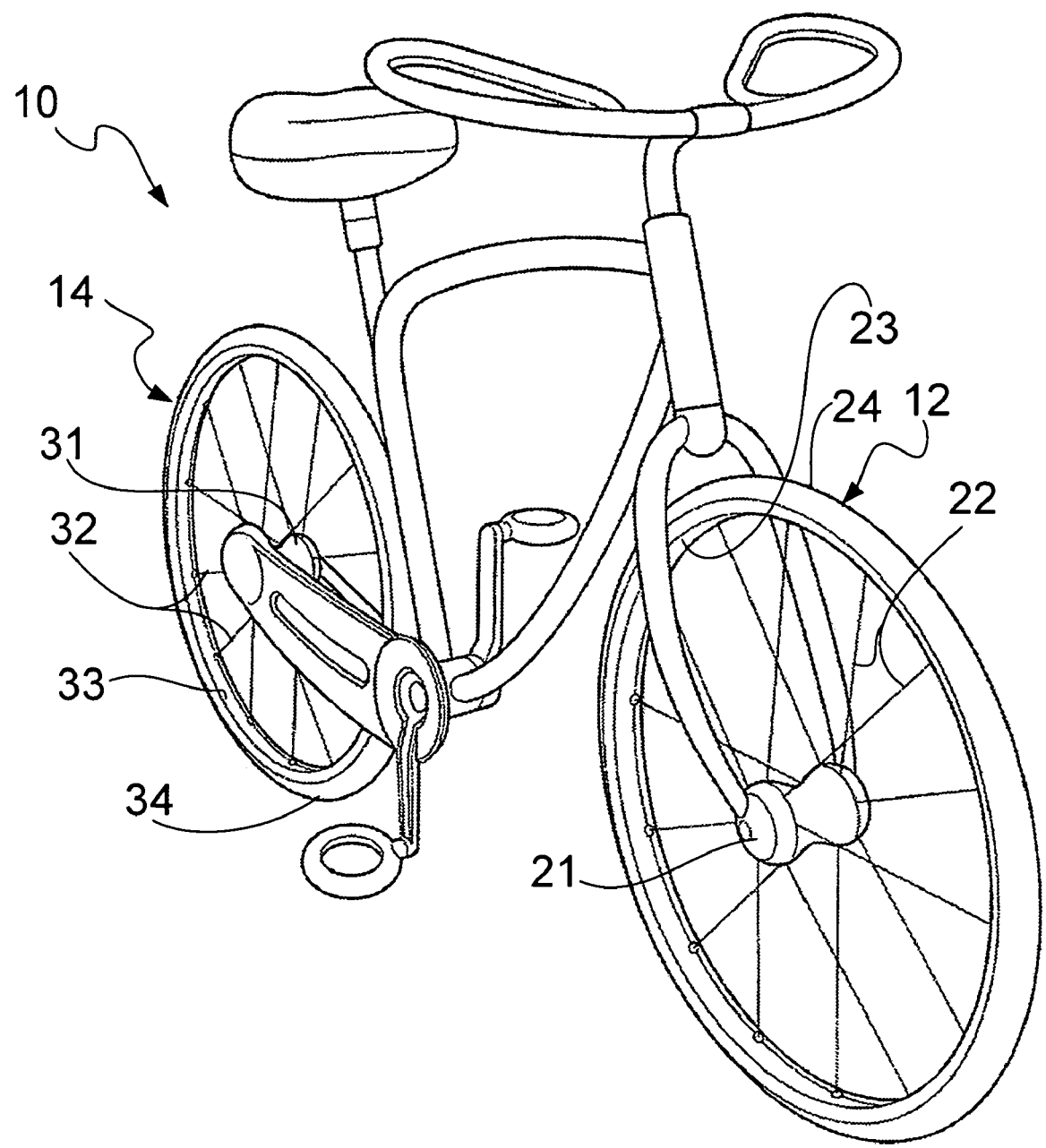
FIG. 1 is a perspective view of a bicycle that is equipped with front and rear non-pneumatic bicycle wheels in accordance with a first embodiment of the present invention.

Referring initially to FIG. 1, a bicycle 10 is illustrated that is equipped with a pair of non-pneumatic bicycle wheels 12 and 14 in accordance with a first embodiment of the present invention. Since the parts of the bicycle 10 other than the wheels 12 and 14 are well known in the art, only the non-pneumatic bicycle wheels 12 and 14 of the bicycle 10 that relate to the present invention will be discussed or illustrated in detail. Also as used herein to describe the non-pneumatic bicycle wheels 12 and 14 of the present invention, the following directional terms "forward, rearward, above, downward, vertical, horizontal, below and transverse" as well as any other similar directional terms refer to those directions of a bicycle equipped with the non-pneumatic bicycle wheels 12 and 14 of the present invention. Accordingly, these terms, as utilized to describe the present invention should be interpreted relative to a bicycle equipped with the non-pneumatic bicycle wheels 12 and 14 of the present invention.

The front non-pneumatic bicycle wheel 12 basically includes a front bicycle hub 21, a plurality of spokes 22, a front rim 23 and a front non-pneumatic tire 24. The inner ends of the spokes 22 are connected to the front bicycle hub 21, while the outer ends of the spokes 22 are connected to the front rim 23 via spoke nipples (not shown). The structure of the front non-pneumatic bicycle wheel 12 is basically conventional, except for the rim 23 and the non-pneumatic tire 24 as explained below.

The rear non-pneumatic bicycle wheel 14 basically includes a rear bicycle hub 31, a plurality of spokes 32, a rear rim 33 and a rear non-pneumatic tire 34. The inner ends of the spokes 32 are connected to the rear bicycle hub 31, while the outer ends of the spokes 32 are connected to the rear rim 23 via spoke nipples (not shown). The structure of the rear non-pneumatic bicycle wheel 14 is basically conventional, except for the rim 33 and the non-pneumatic tire 34 which are identical to the rim 23 and the non-pneumatic tire 24 of the front non-pneumatic bicycle wheel 12. Thus, in view of the similarities of the front and rear non-pneumatic bicycle wheels 12 and 14, only the front non-pneumatic bicycle wheel 12 will be discussed herein.

The rim 23 is an annular member designed for rotation about a center axis of the hub 21. The rim 23 is constructed of a substantially rigid material, such as those materials, which are well known in the art. For example, the rim 16 can be constructed of any suitable metallic material, such as plated steel, stainless steel, aluminum, magnesium or titanium, as well as other non-metallic materials, such as a carbon fiber composite.

Figure 2:
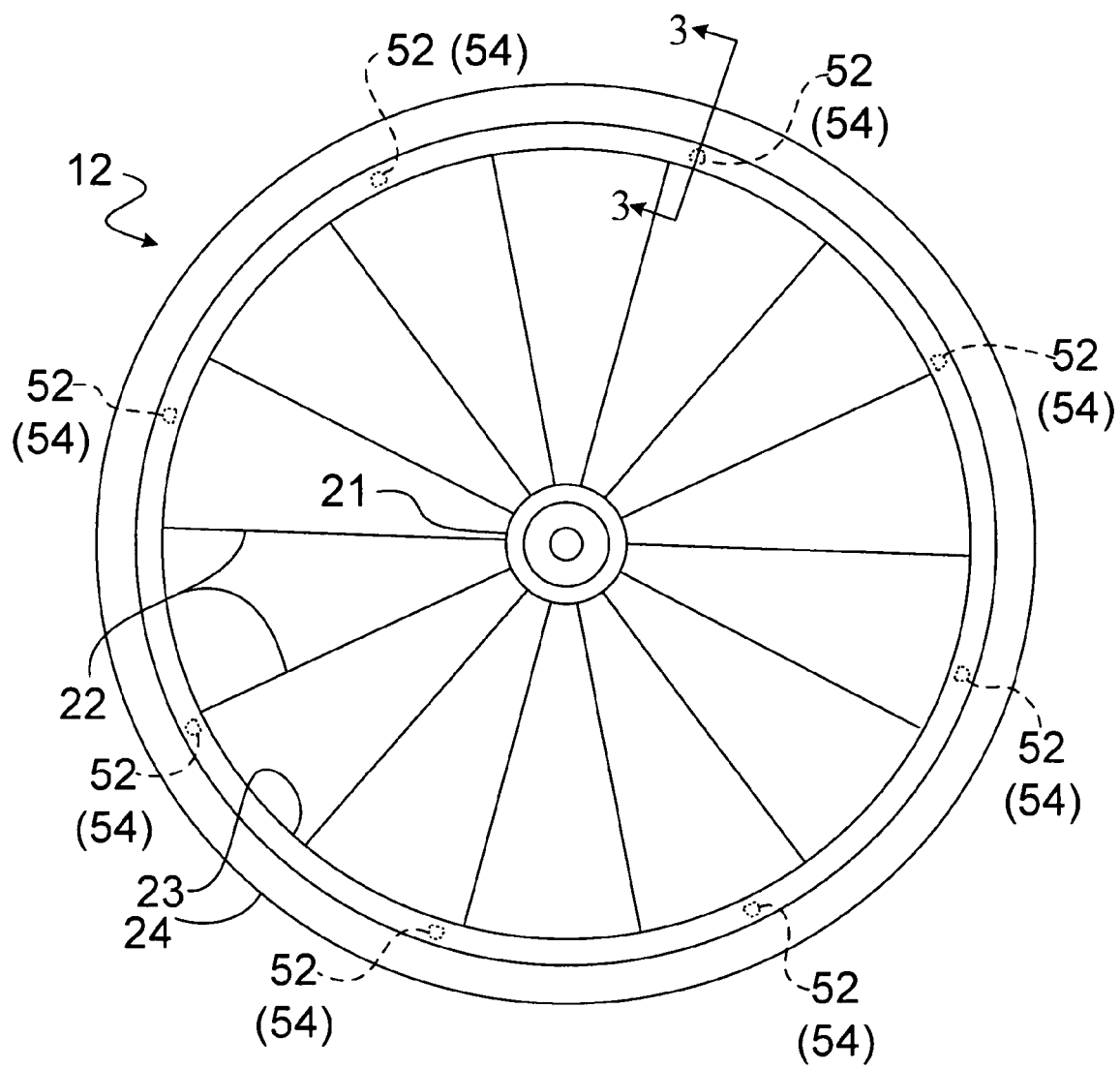
FIG. 2 is a side elevational view of the front non-pneumatic bicycle wheel in accordance with the first embodiment of the present invention.
Figure 3:
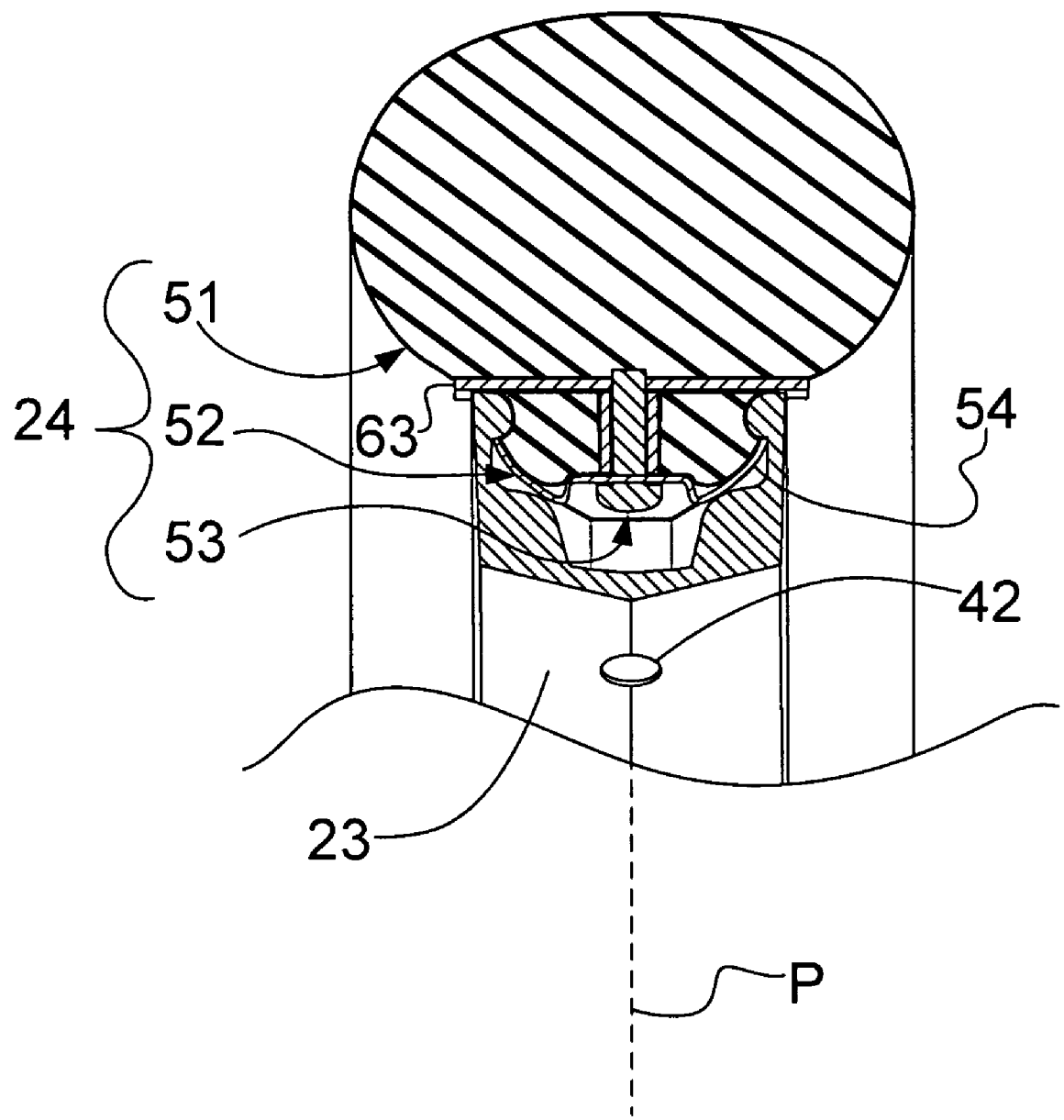
FIG. 3 is an enlarged partial cross-sectional view of the front non-pneumatic bicycle wheel illustrated in FIG. 2 as seen along section line 3—3 of FIG. 2.
Figure 8:
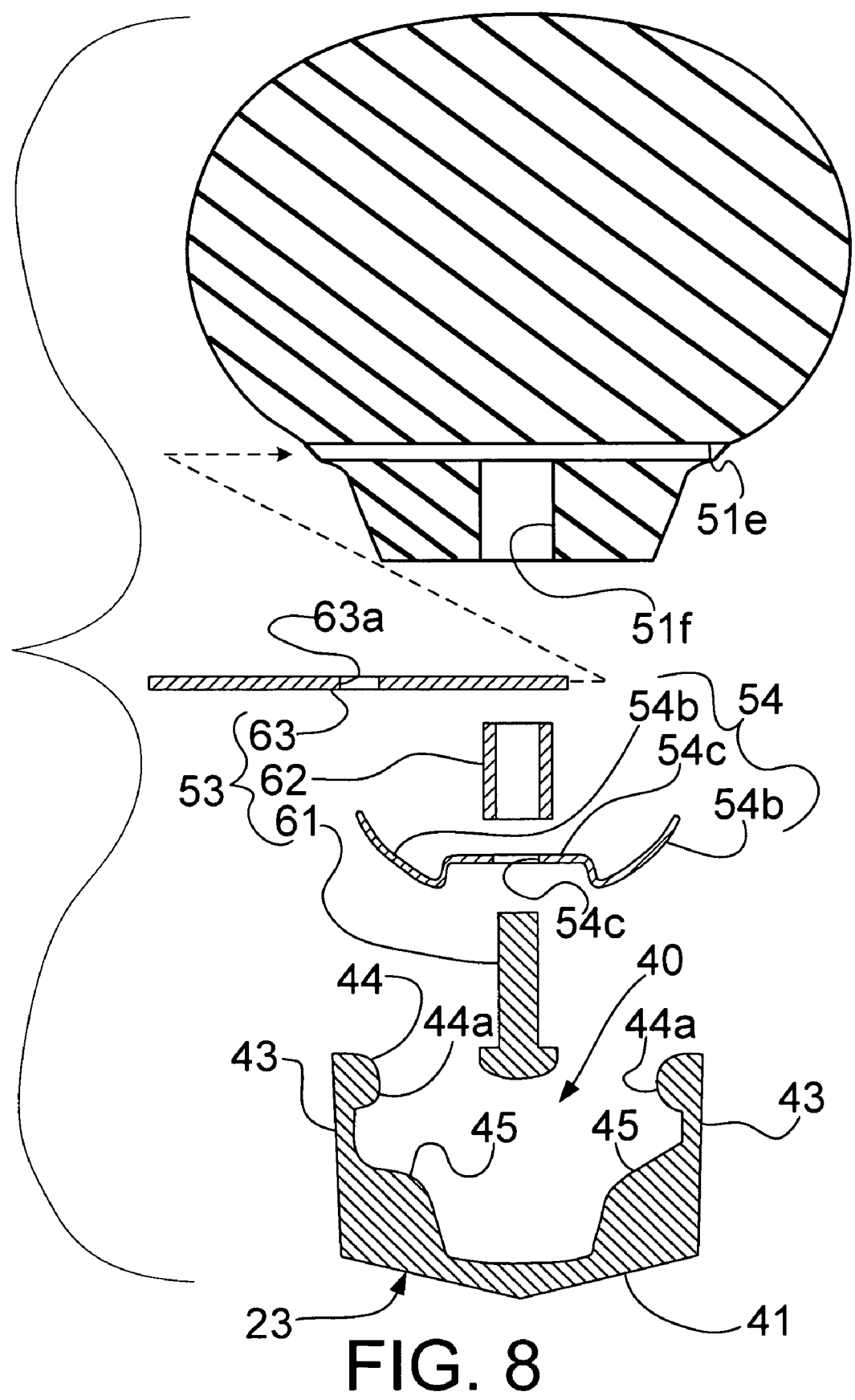
FIG. 8 is an exploded cross-sectional view of the front non-pneumatic bicycle tire illustrated in FIGS. 2 to 4.

Referring to FIGS. 2, 3 and 8, the rim 23 is substantially circular as seen in side elevation (see, FIG. 2), and has a generally U-shaped cross sectional profile (see, FIGS. 3 and 8) that forms a tire receiving recess 40. The rim 23 basically includes an inner annular portion 41 with a plurality of spoke attachment openings 42, and a pair of opposite lateral walls 43 extending outwardly from opposite ends of the inner annular portion 41 in a radial direction relative to the center axis of the rim 23.

Each of the free ends of the lateral walls 43 has an annular rim protrusion or tire retaining bead 44 for engaging and retaining the non-pneumatic tire 24 partially within the receiving recess 40 of the rim 23. The rim protrusions or tire retaining beads 44 protrude towards each other to form a pair of inside abutment surfaces 44a that contact and engage the opposite sides of the non-pneumatic tire 24.

The receiving recess 40 of the rim 23 also has a pair of annular tire contact surfaces 45 disposed at the intersections of the lateral walls 43 to the opposite ends of the inner annular portion 41. The tire contact surfaces 45 are configured and arranged to limit radial inward movement of the non-pneumatic tire 24 relative to the rim 23, when the non-pneumatic tire 24 is installed on the rim 23 and a radially directed force is applied to the non-pneumatic tire 24, as discussed below. Basically, the rim 23 has a uniform cross-sectional profile as seen in FIG. 3, except for the absence of material at the spoke attachment openings 42 formed in the rim 23.

Figure 4:
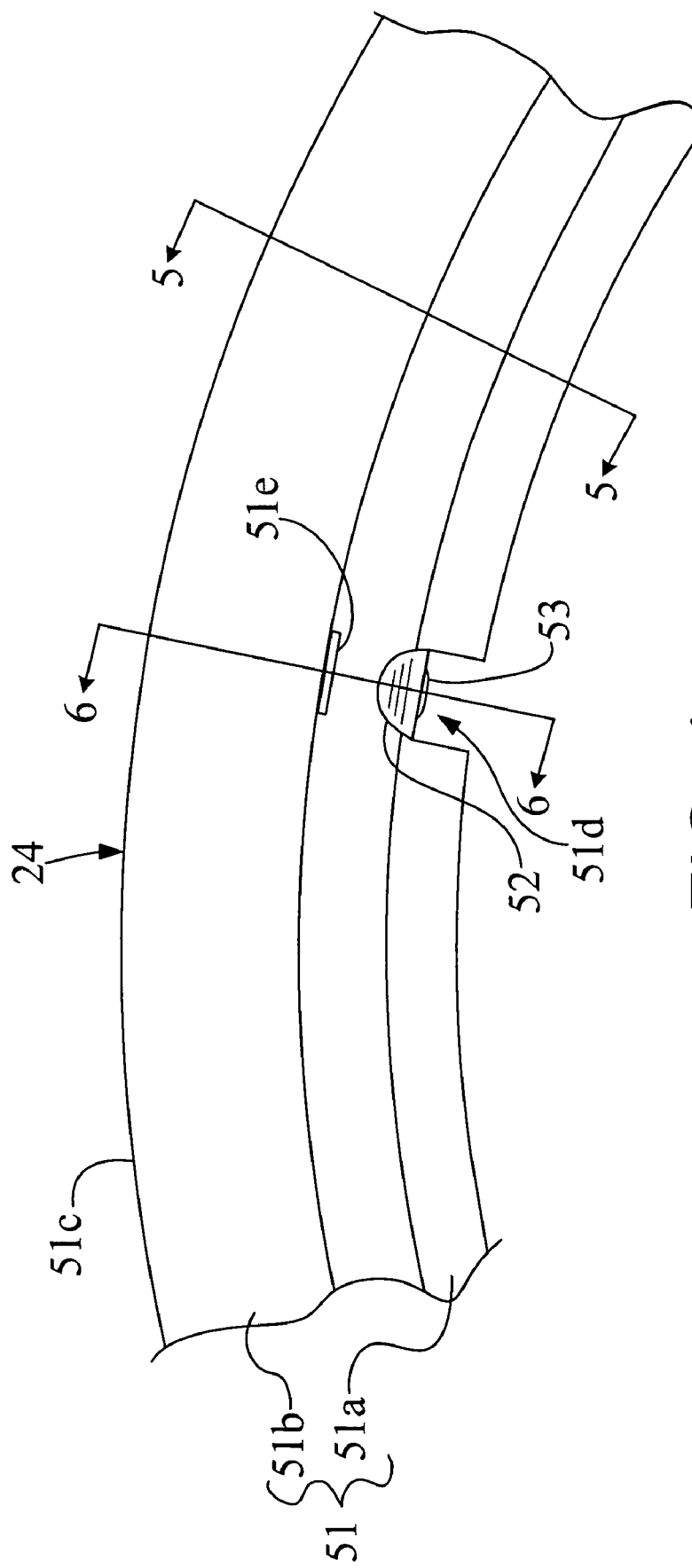
FIG. 4 is a partial side elevational view of the non-pneumatic bicycle tire of the front non-pneumatic bicycle wheel illustrated in FIG. 2 with one of the rim retaining structures secured to the main tire body by one of the attachment structures in accordance with the first embodiment of the present invention.
Figure 5:
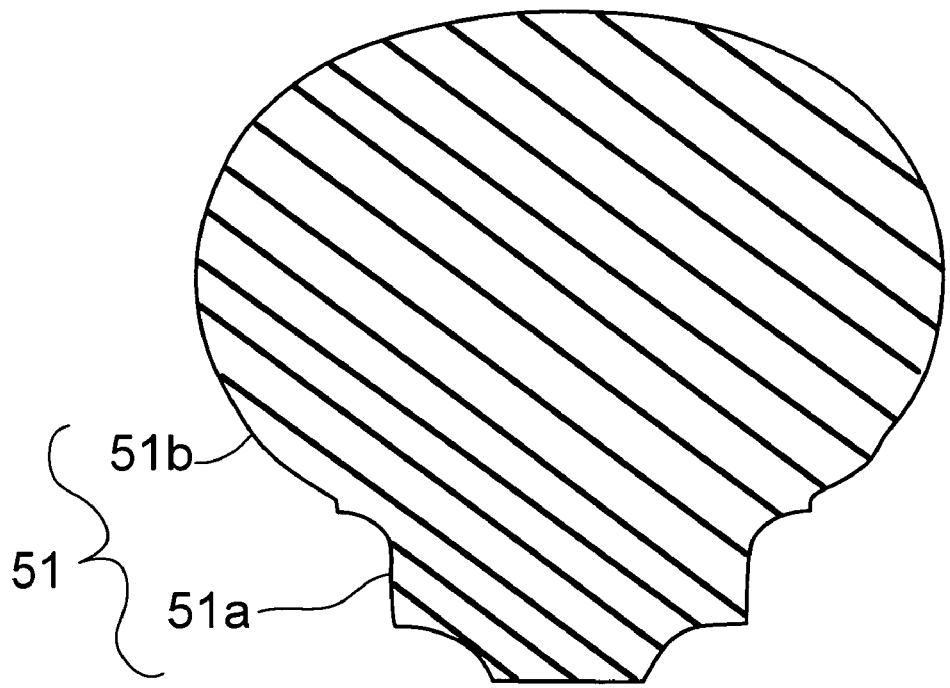
FIG. 5 is an enlarged cross-sectional view of the front non-pneumatic bicycle tire illustrated in FIGS. 2–4 as seen along section line 5—5 of FIG. 4.
Figure 6:
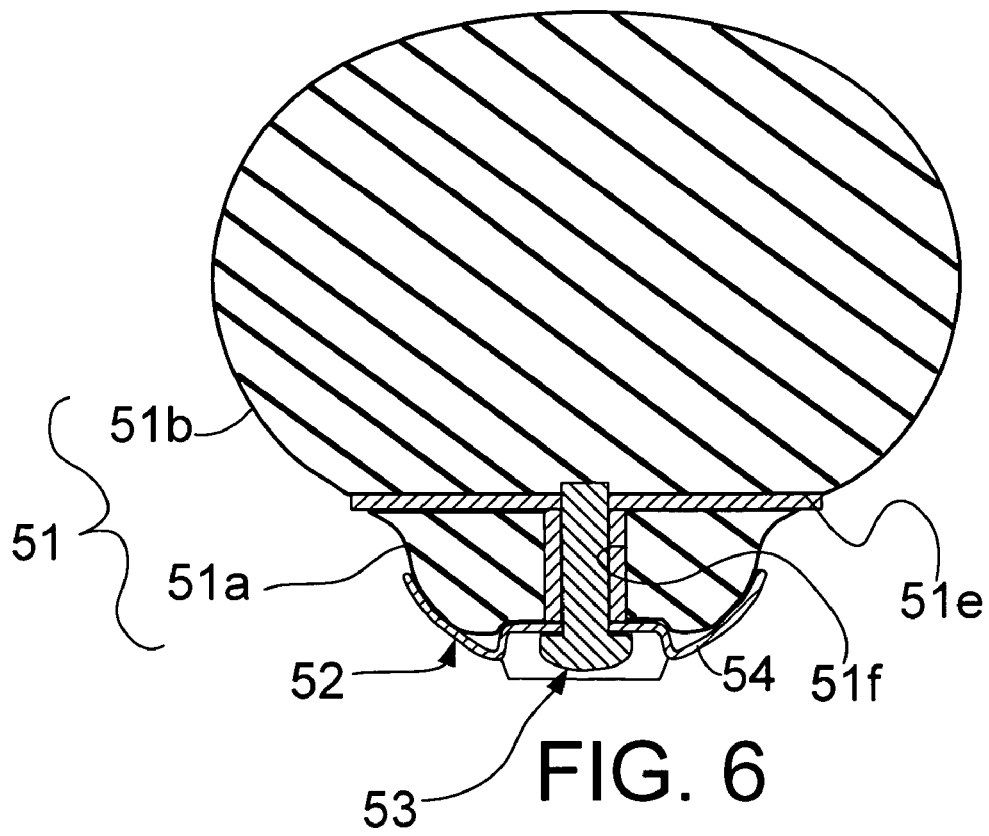
FIG. 6 is an enlarged cross-sectional view of the front non-pneumatic bicycle tire illustrated in FIGS. 2–4, but as seen along section line 6—6 of FIG. 4.
Figure 7:
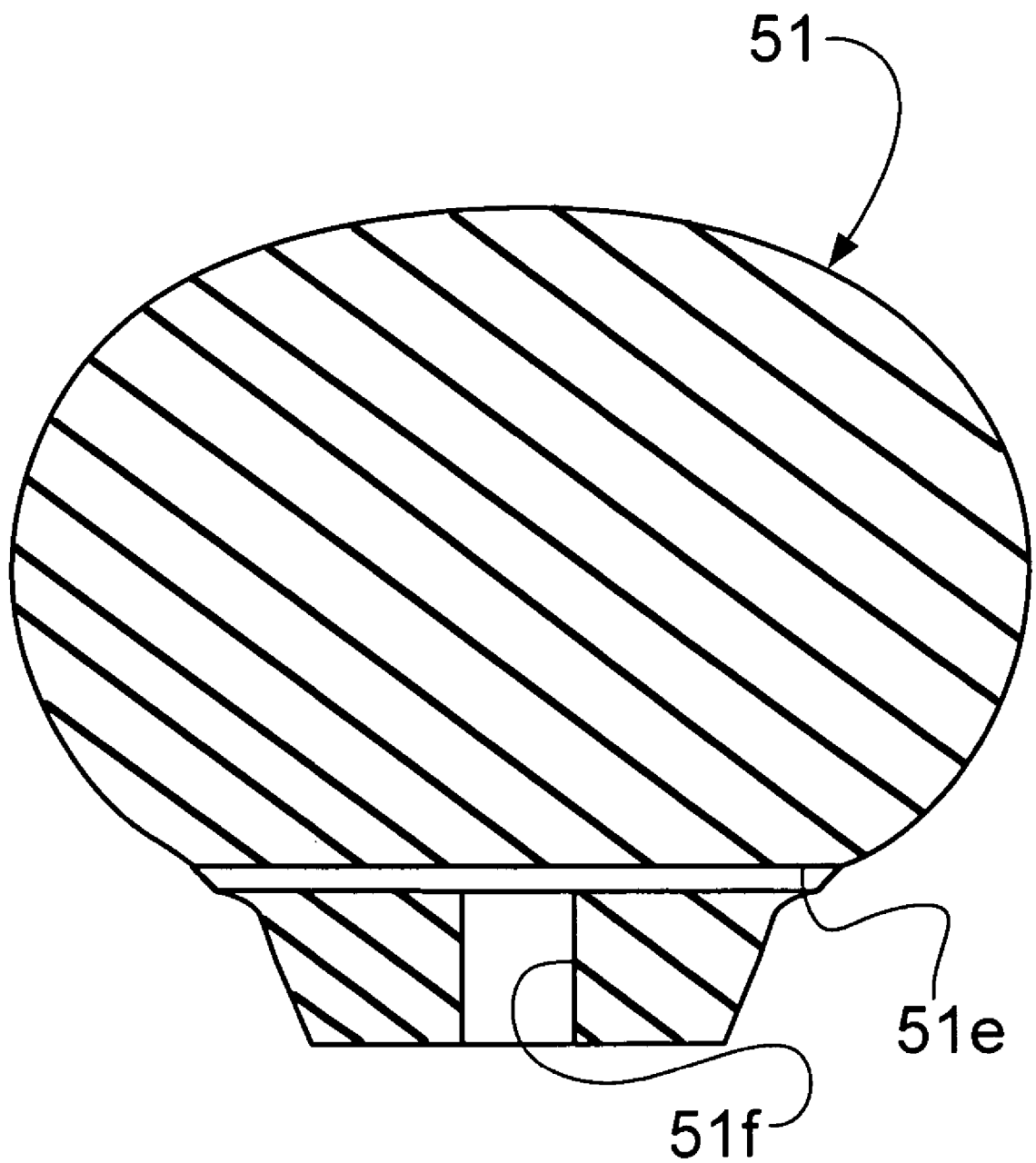
FIG. 7 is an enlarged cross-sectional view, similar to FIG. 6, of the front non-pneumatic bicycle tire illustrated in FIGS. 2 to 4, but with the rim retaining structure and the attachment structure removed.

Referring to FIGS. 4 to 6, the non-pneumatic tire 24 basically includes a main tire body 51, a rim retaining structure 52 and an attachment structure 53. The main tire body 51 is secured to the rim 23 by the rim retaining structure 52 engaging the tire retaining beads 44 of the rim 23.

The main tire body 51 is a solid one-piece, unitary member. The main tire body 51 is preferably formed from a solid urethane foam or elastomeric material that is suitable for a solid bicycle tire. It should be understood from this disclosure that another elastomeric or urethane material can be used as long as it can carry out the present invention. The main tire body 51 basically includes a rim engagement portion 51a and a ground contact portion 51b with a ground contact surface 51c. The rim engagement portion 51a has a plurality of cutouts 51d in its inner peripheral surface and a plurality of slots 51e located radially outwardly above the cutouts 51d. A radially extending hole 51f connects corresponding one of the cutouts 51d to a corresponding one of the slots 51e. The cutouts 51d, the slots 51e and holes 51f are configured and arranged to accommodate the rim retaining structure 52 and the attachment structure 53 as explained below.

The rim engagement portion 51a is configured and arranged to be tightly received with the receiving recess 40 of the rim 23, while the ground contact portion 51b is configured and arranged to project outwardly from the rim 23 in a radial direction. Preferably, the rim engagement portion 51a is configured and arranged to be compressed towards a center plane P (shown in FIG. 3) bisecting the main tire body 51 when the rim engagement portion 51a is received with the receiving recess 40 of the rim 23.

The rim retaining structure 52 is fixedly coupled to the main tire body 51. The rim retaining structure 52 engages the tire retaining beads 44 of the rim 23 to firmly retain the rim engagement portion 51a of the main tire body 51 within the receiving recess 40 of the rim 23. Preferably, as shown in FIGS. 2, 3 and 6, the rim retaining structure 52 includes a plurality of identically shaped rim retaining members 54 fixedly coupled to the rim engagement portion 51a of the main tire body 51 by the attachment structure 53. The retaining members 54 are circumferentially spaced around an inner peripheral surface of the rim engagement portion 51a in this embodiment. Preferably, the retaining members 54 are equally spaced part along the inner peripheral surface of the rim engagement portion 51a.

Figure 9:
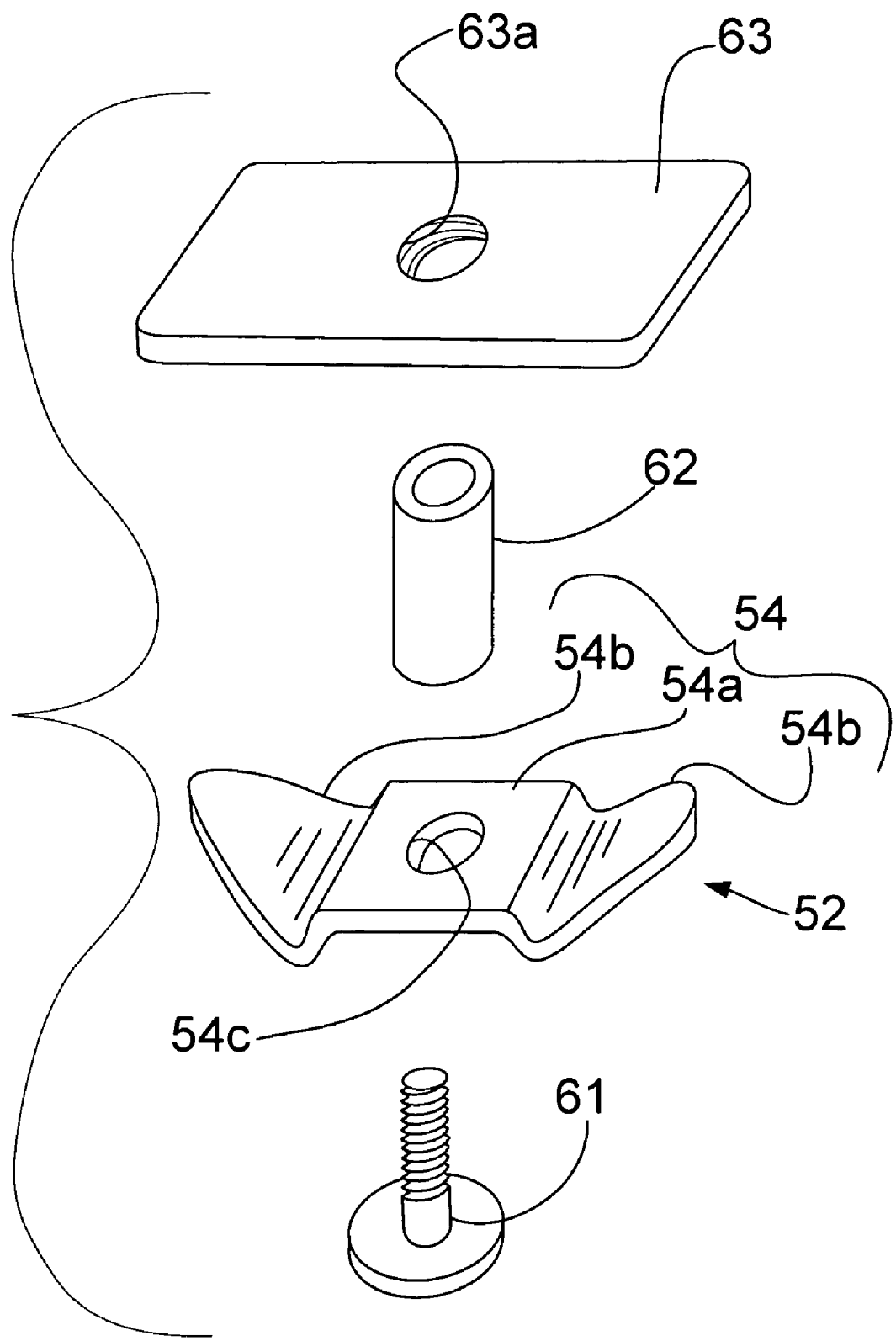
FIG. 9 is an exploded perspective view of the rim retaining structure and the attachment structure for attaching the main tire body to the rim in accordance with the first embodiment of the present invention.

As is shown more clearly in FIGS. 8 and 9, each of the retaining members 54 includes a center connecting portion 54a and a pair of elastically deformable rim retaining portions 54b extending laterally in opposite axial directions from the center connecting portion 54a. The center connecting portion 54a and the elastically deformable rim retaining portions 54b are preferably formed as a one-piece, unitary member such as a thin resilient sheet material that is bent to the shape. Each of the center connecting portions 54a of the retaining members 54 has a center fastener hole 54c such that the retaining members 54 are reliably coupled to the inner peripheral surface of the rim engagement portion 51a by the attachment structure 53.

The elastically deformable rim retaining portions 54b are configured and arranged to bend elastically inwardly in an axial direction of the main tire body 51 during installation on the rim 23. In other words, the elastically deformable rim retaining portions 54b extend outwardly from the connecting portion 54a so that when the rim engagement portion 51a is initially being inserted into the receiving recess 40 of the rim 23, the elastically deformable rim retaining portions 54b contact the rim protrusions or tire retaining beads 44. Then, further insertion of the rim engagement portion 51a into the receiving recess 40 of the rim 23 causes the elastically deformable rim retaining portions 54b to be squeezed towards each other. After the elastically deformable rim retaining portions 54b pass over the rim protrusions or tire retaining beads 44, the elastically deformable rim retaining portions 54b spring back to their original configurations to contact the inside abutment surfaces 44a of the rim protrusions or tire retaining beads 44.

When the rim engagement portion 51a is completely installed into the receiving recess 40 of the rim 23, the elastically deformable rim retaining portions 54b contact the tire contact surfaces 45. Thus, inward deflection of the main tire body 51 at the cutouts 51d is restricted by the elastically deformable rim retaining portions 54b contacting the tire contact surfaces 45. In the event, a force is applied to the main tire body 51 in a radially outward direction (i.e., a force pulling the main tire body 51 out of the rim 23), the elastically deformable rim retaining portions 54b will bend elastically outwardly in the axial direction of the main tire body 51 to prevent separation of the main tire body 51 from the rim 23. In other words, the free ends of the elastically deformable rim retaining portions 54b contact the rim protrusions or tire retaining beads 44 causes the elastically deformable rim retaining portions 54b to spread apart. Thus, when a radially outward force is applied to the main tire body 51, the rim protrusions or tire retaining beads 44 will apply a counteracting force on the free ends of the elastically deformable rim retaining portions 54b to prevent separation of the main tire body 51 from the rim 23. Accordingly, each of the free ends of the elastically deformable rim retaining portions 54b forms an outer abutment surface that is located adjacent a sidewall of the rim engagement portion 51a and that faces outwardly in a generally outward radial direction to engage one of the rim protrusions or tire retaining beads 44 of the rim 23 to prevent separation of the main tire body 51 from the rim 23.

As best seen in FIGS. 3, 8 and 9, the attachment structure 53 basically includes a first fastening member or screw 61, a tubular spacer or bushing 62 and a second fastening member or nut plate 63 for each of the rim retaining members 54. The first fastening members or screws 61 are threaded into center holes 63a of the second fastening members or nut plates 63 to form a plurality of fasteners.

The second fastening members or nut plates 63 are preferably metal plates with each of the nut plates 63 having a threaded hole 63a. The threaded hole 63a is configured and arranged to threadedly receive one of the screws 61 therein. In the first embodiment, the second fastening members or nut plates 63 are partially embedded in the rim engagement portion 51a or inserted into the slots 51e of the rim engagement portion 51a. Alternatively, the attachment structure 53 can be reversed so that the first fastening members or screws 61 are partially embedded in the rim engagement portion 51a, as needed and/or desired.

The tubular spacers or bushings 62 are preferably metal tubes that are sized to receive the threaded portion of one of the screws 61 therein. The tubular spacers or bushings 62 are disposed in the radially extending holes 51f of the main tire body 51 such that they abut against the corresponding one of the second fastening members or nut plates 63.

Second Embodiment

Figure 10:
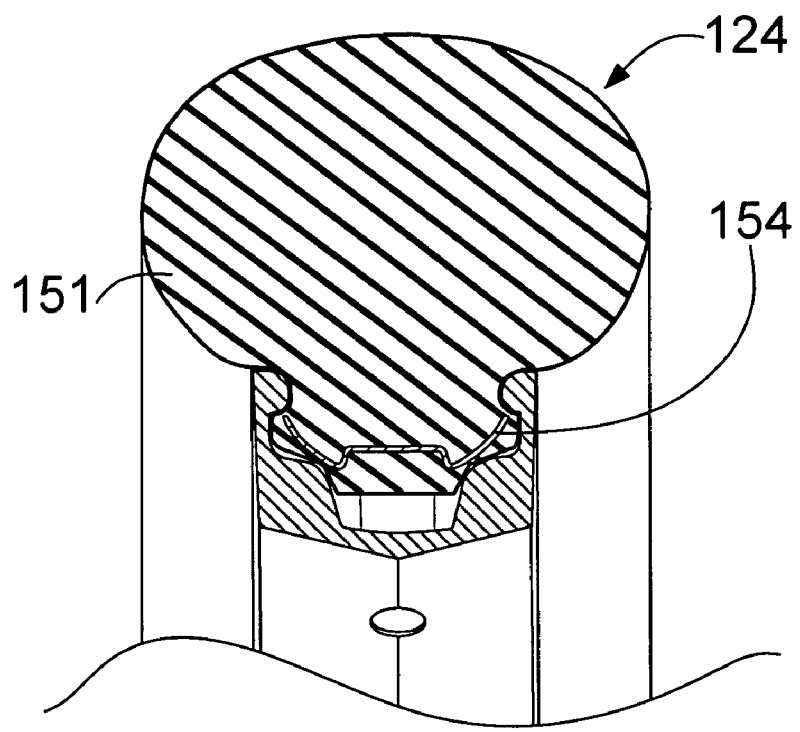
FIG. 10 is an enlarged partial cross-sectional view, similar to FIG. 3, of a front non-pneumatic bicycle wheel in accordance with a second embodiment of the present invention.
Figure 11:
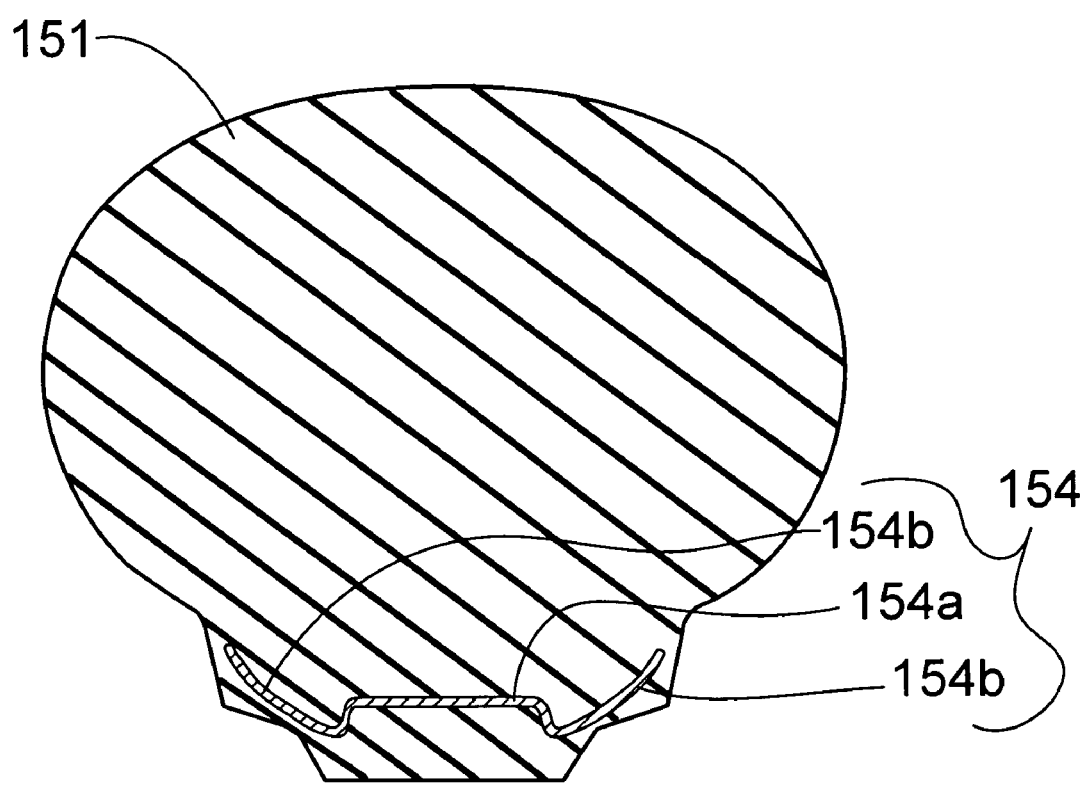
FIG. 11 is an enlarged partial cross-sectional view of the front non-pneumatic bicycle tire of the front non-pneumatic bicycle wheel illustrated in FIG. 10 in accordance with the second embodiment of the present invention.

Referring now to FIGS. 10 and 11, a non-pneumatic bicycle tire 124 is illustrated in accordance with a second embodiment, which will now be explained. The non-pneumatic bicycle tire 124 is configured and arranged to be installed in the rim 23 or 33. Basically, the structure of non-pneumatic bicycle tire 124 is identical to the non-pneumatic bicycle tire 24 of the first embodiment, except that a main tire body 151 has a plurality of retaining members 154 are molded therein instead of being attached by fasteners.

In the non-pneumatic bicycle tire 124 of this second embodiment, the main tire body 151 has a uniform cross section that is identical to FIG. 5, except at eight equally spaced apart locations one of the retaining members 154 is completely embedded in the main tire body 151 as seen in FIG. 11. The retaining members 154 are identical to the retaining members 54 of the first embodiment, including center portion 154a and a pair of elastically deformable rim retaining portions 154b, except the central portion 154a is absent the fastener hole. In view of the similarity between the first and second embodiments, the descriptions of the parts of the second embodiment that are identical to the parts of the first embodiment may be omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-pneumatic bicycle tire comprising:
    a main tire body including a rim engagement portion and a ground contact portion with a ground contact surface;
    at least one first rim retaining member fixedly attached to the rim engagement portion, and including a pair of elastically deformable rim retaining portions extending laterally in opposite axial directions, the elastically deformable rim retaining portions being configured and arranged to bend elastically inwardly in an axial direction of the main tire body during installation on the rim; and
    at least one second rim retaining member disposed within the main tire body radially outwardly spaced apart from the at least one first rim retaining member, the first and second rim retaining members being configured to compress the rim engagement portion of the main tire body upon installation on a rim.

2. The non-pneumatic bicycle tire according to claim 1, wherein
    the first rim retaining member further includes a center connecting portion coupling the elastically deformable rim retaining portions together.

3. The non-pneumatic bicycle tire according to claim 2, wherein
    the center connecting portion and the elastically deformable rim retaining portions are formed as a one-piece, unitary member.

4. The non-pneumatic bicycle tire according to claim 3, wherein
    the first retaining member is constructed from a thin metal sheet material.

5. The non-pneumatic bicycle tire according to claim 1, wherein
    the rim engagement portion has a plurality of additional first and second rim retaining members having an identical shape to the first and second rim retaining members, respectively.

6. The non-pneumatic bicycle tire according to claim 5, wherein
    the first and second rim retaining members are substantially equally spaced apart around the rim engagement portion in a circumferential direction.

7. The non-pneumatic bicycle tire according to claim 1, wherein
    the elastically deformable rim retaining portions are further configured and arranged to bend elastically outwardly in the axial direction of the main tire body upon an application of a force pulling the main tire body radially outward of a rim with a pair of rim protrusions when installed on the rim.

8. The non-pneumatic bicycle tire according to claim 1, wherein
    each of the elastically deformable rim retaining portions has an outer abutment surface that is located adjacent a sidewall of the rim engagement portion and that faces outwardly in a generally outward radial direction.

9. The non-pneumatic bicycle tire according to claim 1, wherein
    the elastically deformable rim retaining portions are attached to a radially inwardly facing surface of the rim engagement portion.

10. The non-pneumatic bicycle tire according to claim 1, further comprising
    a fastening member extending between the first and second rim retaining members, the fastening member arranged to selectively urge the first and second rim retaining members toward one another upon installation on the rim.

11. The non-pneumatic bicycle tire according to claim 10, wherein
    the fastening member is a bolt and the second rim retaining member is a nut that is located in a slot extending from a sidewall of the main tire body.

12. The non-pneumatic bicycle tire according to claim 11, wherein
    the nut includes a plate that extends in the slot between opposite sidewalls of the main tire body.

13. The non-pneumatic bicycle tire according to claim 1, further comprising
    a fastening member extending between the first and second rim retaining members, the fastening member being configured to urge the first and second rim retaining members toward one another thereby exerting a compressive force on the rim engagement portion of the main tire body.

* * * * *